(12) United States Patent
Chung

(10) Patent No.: US 7,613,065 B2
(45) Date of Patent: Nov. 3, 2009

(54) MULTI-PORT MEMORY DEVICE

(75) Inventor: Jin-Il Chung, Kyoungki-do (KR)

(73) Assignee: Hynix Semiconductor, Inc., Gyeonggi-do (KR)

( * ) Notice: Subject to any disclaimer, the term of this patent is extended or adjusted under 35 U.S.C. 154(b) by 254 days.

(21) Appl. No.: 11/528,671

(22) Filed: Sep. 28, 2006

(65) Prior Publication Data

US 2007/0073980 A1    Mar. 29, 2007

(30) Foreign Application Priority Data

Sep. 29, 2005 (KR) ...................... 10-2005-0090937
Apr. 13, 2006 (KR) ...................... 10-2006-0033764

(51) Int. Cl.
*G11C 8/00* (2006.01)

(52) U.S. Cl. .............................. 365/230.05; 365/230.03; 365/189.04; 365/189.17; 365/189.18; 365/185.11; 711/149; 711/147; 711/131; 711/117; 711/118

(58) Field of Classification Search ............ 365/230.05, 365/230.03, 189.04, 189.17, 189.18, 185.11; 711/149, 147, 131, 117, 118
See application file for complete search history.

(56) References Cited

U.S. PATENT DOCUMENTS 5,815,456 A * 9/1998 Rao ...................... 365/230.03
5,848,019 A * 12/1998 Matthews et al. ...... 365/230.06
5,875,470 A * 2/1999 Dreibelbis et al. ......... 711/147
7,006,402 B2 * 2/2006 Park et al. .............. 365/230.05
7,042,791 B2 * 5/2006 Park ...................... 365/230.05
7,149,139 B1 * 12/2006 Rosen ......................... 365/221
7,178,008 B2 * 2/2007 Hironaka et al. ............. 712/215
2003/0200422 A1 * 10/2003 Hironaka et al. ............. 712/215
2006/0161338 A1 * 7/2006 Sohn et al. ................... 701/202

FOREIGN PATENT DOCUMENTS

KR            1999-71554        9/1999
KR       10-2005-0022855        3/2005
KR         1020070036610 A      4/2007

OTHER PUBLICATIONS

Korean Office Action issued in Korean Patent Application No. KR 10-2006-0033764, mailed Oct. 24, 2007.
Korean Office Action with English Translation issued in corresponding Korean Patent Application No. 2006-0033764, Mailed on Jun. 12, 2007.

* cited by examiner

*Primary Examiner*—Van Thu Nguyen
*Assistant Examiner*—Eric Wendler
(74) *Attorney, Agent, or Firm*—IP & T Law Firm PLC

(57) ABSTRACT

In a multi-port memory device, a plurality of ports simultaneously access a plurality of banks through global data buses. A data conflict detector compares valid data signals input from the plurality of ports through the global data buses to the plurality of banks, and detects data conflict caused when the valid data signals are simultaneously input to the same bank.

11 Claims, 13 Drawing Sheets

FIG. 4C
(RELATED ART)

| 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|----|----|----|----|
| PHY | CMD | LDM | | | UPPER BYTE | | | | | | | | | LOWER BYTE | | | | | |
| 1 | 0 | '0' | LDM | 7 | 6 | 5 | 4 | 3 | 2 | 1 | 0 | 7 | 6 | 5 | 4 | 3 | 2 | 1 | 0 |

FIG. 4D
(RELATED ART)

| 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|----|----|----|----|
| PHY | CMD | ACT | WT | PCG | RD | ESC | ABNK | RFU | | BANK | | | | COLUMN ADDRESS | | | | | |
| 1 | 0 | '1' | '0' | '0' | PCG | '1' | '0' | ABNK | '0' | 3 | 2 | 1 | 0 | 5 | 4 | 3 | 2 | 1 | 0 |

FIG. 4E
(RELATED ART)

| 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|---|---|---|---|---|---|---|---|---|---|
| PHY |  | ID |  | \multicolumn{8}{c}{UPPER BYTE} | | | | | | | | | LOWER BYTE | | | | | | | |
| 1 | 0 | '1' | '0' | 7 | 6 | 5 | 4 | 3 | 2 | 1 | 0 | 7 | 6 | 5 | 4 | 3 | 2 | 1 | 0 |

FIG. 4F
(RELATED ART)

| 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|---|---|---|---|---|---|---|---|---|---|
| PHY | | CMD | ACT | \multicolumn{16}{c}{COMMAND INFOMATION} | | | | | | | | | | | | | | | | |
| 1 | 0 | '1' | ACT | 15 | 14 | 13 | 12 | 11 | 10 | 9 | 8 | 7 | 6 | 5 | 4 | 3 | 2 | 1 | 0 |

MULTI-PORT MEMORY DEVICE

FIELD OF THE INVENTION

The present invention relates to a semiconductor memory device; and, more particularly, to an erroneous operation detection of a multi-port memory device having a serial input/output (I/O) interface for multiple concurrent processing with external devices.

DESCRIPTION OF RELATED ART

Generally, most memory devices including a random access memory (RAM) have a single port with a plurality of I/O pin sets. The single port is provided for data exchange with an external chipset. The memory device having the single port uses parallel I/O interface for simultaneously transferring data of several bits through signal lines connected to a plurality of I/O pins. That is, data are exchanged with an external device through a plurality of I/O pins in parallel.

The I/O interface is an electrical and mechanical scheme to accurately transfer I/O data by connecting unit devices having different functions through signal lines. I/O interfaces, which will be described later, should be construed as having the same meaning as the above-described I/O interface. In addition, the signal lines represent buses to transfer signals, such as address signals, data signals, and control signals. The signal lines will be referred to as buses for convenience of explanation.

Because the parallel I/O interface simultaneously transfers data of several bits through several buses, it has excellent data processing efficiency (speed). Therefore, the parallel I/O interface is widely used in a short distance transmission requiring a high speed. However, because the parallel I/O interface has a large number of buses for transferring I/O data, the product cost increases as the distance is longer. In terms of hardware of a multimedia system, a plurality of memory devices has to be independently configured in order to support various multimedia functions because of the limitation of the single port. Furthermore, when a certain function is operated, another function cannot be operated at the same time.

To overcome these problems, many efforts have been made to replace the memory devices having the parallel I/O interface with the memory devices having the serial I/O interface. I/O environment of the semiconductor memory device needs to change into the serial I/O interface, considering the expansion of the compatibility with other devices having serial I/O interface. In addition, application devices such as audio or video processors are embedded in display devices, such as high definition television (HDTV) and liquid crystal display (LCD) TV. Because these application devices require independent data processing, there is an increasing demand for a multi-port memory device having a serial I/O interface to transfer data through a plurality of ports.

A multi-port memory device having a serial I/O interface is disclosed in Korean Patent Application No. 2006-0032948, filed on Apr. 11, 2006, which claims the benefit of the priority of the earlier Korean Patent Application No. 2005-90936, filed on Sep. 29, 2005.

FIG. 1 is a conceptual diagram of a multi-port memory device disclosed in Korean Patent Application No. 2006-0032948. In FIG. 1, the multi-port memory device with four ports PORT0 to PORT3 and eight banks BANK0 to BANK7 is illustrated in FIG. 1. The multi-port memory device has a 16-bit data frame and performs a 64-bit prefetch operation.

The multi-port memory device includes a plurality of ports PORT0 to PORT3, a plurality of banks BANK0 to BANK3 and BANK4 to BANK7, first global data buses GIO_OUT, second global data buses GIO_IN, and bank controllers BC0 to BC7. The ports PORT0 to PORT3 are arranged at the center portion of the core region in a row direction to independently perform a serial data communication with different target external devices. The banks BANK0 to BANK3 and BANK4 to BANK7 are arranged above and under the ports PORT0 to PORT3 in a row direction. The first global data buses GIO_OUT are arranged between the banks BANK0 to BANK3 and the ports PORT0 to PORT3 in a row direction to transfer data in parallel. The second global data buses GIO_IN are arranged between the banks BANK4 to BANK7 and the ports PORT4 to PORT7 in a row direction to transfer data in parallel. The bank controllers BC0 to BC7 control the signal transfer between the first and second global data buses GIO_OUT and GIO_IN and the banks BANK0 to BANK7.

More specifically, as illustrated in FIG. 2, each of the eight banks BANK0 to BANK7 includes a memory cell array 10, a row decoder 11, a column decoder 12, an equalizer (not shown), a write driver 13, and a data bus sense amplifier 14. The memory cell array 10 includes a plurality of memory cells arranged in an N×M matrix (where M and N are positive integers). The banks BANK0 to BANK7 bisect the core region. That is, the banks BANK0 to BANK7 are symmetrically arranged in such a way that the four banks BANK0 to BANK3 are arranged above the ports PORT0 to PORT3 in a row direction and the four banks BANK4 to BANK7 are arranged under the ports PORT4 to BANK7 in a row direction. The data buses are bit lines that correspond to column lines.

The four ports PORT0 to PORT3 are arranged at the center portion of the core region and are connected to the first and second global data buses GIO_OUT and GIO_IN such that they can access all the banks BANK0 to BANK7. In addition, as illustrated in FIG. 3, each of the ports PORT0 to PORT3 independently includes a receiving part 41 for receiving the input signals through the reception pad RX and a transmitting part 42 for transmitting the output signals through the transmission pad TX to the external device, such that the input signals input from an external device (an application device) through the reception pad RX and the output signal output from the banks BANK0 to BANK7 through the first global data buses GIO_OUT can be simultaneously transferred.

The receiving part 41 parallel-converts the input signal of 20-bit frame, which is serially input from the external device through the reception pad RX, into 26-bit valid signals suitable for the operation of the DRAM. The 26-bit valid signals consist of 8-bit port/bank select signals Pi_BK<0:7> (where i is a positive integer corresponding to the number of the ports and is 0 to 3) and 18-bit input valid data signals Pi_RX<0:17> (where i is 0 to 3). In addition, the 18-bit input valid data signals Pi_RX<0:17> consists of one command flag signal, one row address strobe (RAS)/data mask (DM), and 16-bit command/address/data signals. At this point, the 16-bit command/address/data signals are signals that may be recognized as command, address or data.

FIG. 4 illustrates a frame format of the signals as a protocol for signal transmission. Specifically, FIGS. 4A to 4F illustrate a basic frame format, a write command frame format, a write data frame format, a read command frame format, a read data frame format, and a command frame format, respectively.

As an example, the write command/data frame format of FIGS. 4B and 4C will be described below.

Referring to FIG. 4B, the write command frame format includes 20-bit serial signal input from the external device.

The nineteenth and eighteenth bits PHY are physical link coding bits, the seventeenth bit is "CMD", and the sixteenth to fourteenth bits are ACT (active) and WT (write), and PCG (precharge) signals, respectively. ACT, WT and PCG represent an internal active signal, an internal write command signal, and an internal inactive signal, respectively. For example, the seventeenth to fourteenth bits are "1011" during a normal write operation and "1011" during an auto-precharge write operation. The thirteenth to tenth bits UDM are used as an upper-byte write data mask of a write data applied for 4 clocks. The ninth to sixth bits BANK are bank data written during a write operation. The fifth to zeroth bits COLUMN ADDRESS are column addresses.

In the write data frame of FIG. 4C, 16-bit write data are input for 4 clocks after the write command frame of FIG. 4B is input. In the write data frame format, the seventeenth bit CMD has to be LOW (0), and the sixteenth bit LDM means a lower-byte write data mask of the input data. The fifteenth to eighteenth bits UPPER BYTE and the seventeenth to zeroth bits LOWER BYTE mean the upper byte and the lower byte of the write data, respectively.

A structure of the receiving part 41 will be described below with reference to FIG. 3.

Referring to FIG. 3, the receiving part 41 includes a parallelizer 411, a command generator 412, a bank address generator 413, a bank address output unit 414, and an input valid signal output unit 415.

The parallelizer 411 receives 20-bit (1 frame) input signals that are input as serial signals from the external device through the reception pad RX, and converts the 20-bit input signals into 20-bit parallel signals.

The command generator 412 determines which operation the input signal performs by using the seventeenth bit (command flag bit) among the 20-bit-frame input signals output from the parallelizer 411. That is, when the seventeenth bit in the frame of FIG. 4 is "0", the input signal is determined as a signal for performing the write operation. When the seventeenth bit is "1", the input signal is determined as a signal for performing the read operation. In addition, the command generator 412 outputs bits used as bank data among the bits of the input signal. Because eight banks are provided, 3 bits are used and the bits are contained in the frame payload of FIG. 4.

The bank address generator 413 receives bits (3 bits in this example) from the command generator 412, the bits being used as selection data for selecting the corresponding bank among the banks BANK0 to BANK7, and generates 8-bit bank addresses. To this end, the bank address generator 413 is implemented with a 3×8 decoder to receive the 3-bit input signal and output the 8-bit output signal.

The bank address output unit 414 receives the bank addresses from the bank address generator 413, and transfers the 8-bit bank select signals Pi_BK<0:7> through the second global data buses GIO_IN. The bank address output unit is implemented with a plurality of output drivers. The output drivers are well known to those skilled in the art.

The input valid data output unit 415 receives the 18-bit valid data signals Pi_RX<0:17> from the parallelizer 411 and transfers them through the second global data bus GIO_IN. Like the bank address output unit 414, the input valid data output unit 415 is implemented with a plurality of output drivers.

The transmitting part 42 serializes the output valid data signals Pi_DATA<0:15> (where i is 0 to 3) input from the banks BANK0 to BANK7 through the first global data buses GIO_OUT in parallel.

The transmitting part 42 includes a serializer 421 and an output valid data input unit 422.

The output valid data input unit 422 receives the 16-bit output valid data signals Pi_DATA<0:15> from the banks BANK0 to BANK7 through the first global data buses GIO_OUT in parallel, packetizes the output valid data signals Pi_DATA<0:15>, based on the transfer protocol, under the control of the command generator 412 (the I/O control of the data signals according to the write or read operation), and then generates the output signals with 20-bit frames. The output valid data input unit 422 is implemented with a plurality of input drivers.

The serializer 421 serializes the 20-bit output signals input from the output valid data input unit 422 in parallel, and sequentially outputs the serialized 20-bit output signals through the transmission pad TX.

The first global data buses GIO_OUT include 64 buses (16 (number of data bits)×4 (number of ports)) to independently transfer the output valid data signals Pi_DATA<0:15> input from the banks BANK0 to BANK7 to the ports PORT0 to PORT3 in parallel.

The second global data buses GIO_IN include 104 buses (26 (number of data bits)×4 (number of ports)) to independently transfer the 26-bit signals (18-bit input valid data signals and 8-bit bank select signals) input from the ports PORT0 to PORT3 to the banks BANK0 to BANK7 in parallel.

The first and second global data buses GIO_OUT and GIO_IN are connected to local data buses so as to transfer data to the bank controllers BC0 to BC7 or the ports PORT0 to PORT3. That is, the local data buses connect the first and second global data buses GIO_OUT and GIO_IN to the bank controllers BC0 to BC7 and the ports PORT0 to PORT3. For convenience, the first to fourth local data buses LIO_BOUT, LIO_BIN, LIO_P1 and LIO_P2 are illustrated in FIG. 1.

The bank controllers BC0 to BC7 are installed in the banks one by one so as to manage the respective banks BANK0 to BANK7. The bank controllers BC0 to BC7 manage the signal transfer between the banks BANK0 to BANK7 and the ports PORT0 to PORT3. As illustrated in FIG. 5, each of the bank controllers BC0 to BC7 includes a parallelizer 61, a serializer 62, a state machine 63, an input signal status determiner 64, a bank selector 65, and a port selector 66.

In response to the port/bank select signal P/B_SELECT, the bank selector 65 selects the signals to be input to the corresponding bank among the input valid data signals Pi_RX<0:17> independently input from the ports PORT0 to PORT3, and transfers the selected signals to the corresponding bank. The reason for this operation is that the input valid data signals Pi_RX<0:17> can be simultaneously input from all the ports PORT0 to PORT3 through the second global data buses GIO_IN. At this point, the port/bank select signal P/B_SELECT includes the bank select signal Pi_BK<0:7> output from the bank address output units 414 of the banks BANK0 to BANK3 illustrated in FIG. 3. The bank selector 65 receives the 26-bit signals, including the 18-bit input valid data signals Pi_RX<0:17> input from the ports PORT0 to PORT3 through the first global data buses GIO_JN and the 8-bit port/bank select signals Pi_BK<0:7> for selecting the banks BANK0 to BANK7, and outputs the 18-bit bank valid data signals BRX<0:17>.

Among the 18-bit bank valid data signals BRX<0:17> output from the bank selector 65, 16 bits are used as signals (command signals) for determining status of data, address or bank, 1 bit is used as the active flag signal, and 1 bit is used as the command flag signal for determining whether the 16-bit signals are data signals, address signals, or command signals. As one example, BRX<17> is used as the command flag signal, and BRX<16> is used as the active flag signal. The command flag signal BRX<17> is used as the enable signal of the state machine 63, and the active flag signal is used as the RAS/DM signal serving as the operating signal of the DRAM. RAS is a chip enable signal for controlling the entire DRAM and is an initial operating signal of the DRAM.

The input signal status determiner 64 receives the 18-bit bank valid data signals BRX<0:17> from the bank selector 65 and determines whether the 18-bit bank valid data signals BRX<0:17> are data, address or command signals. Specifically, using the status (0 or 1) of the command flag signal that is the most significant bit of the 18-bit bank valid data signals BRX<0:17>, the input signal status determiner 64 determines whether the 16-bit signals BRX<0:15> except for the seventeenth bit BRX<16> is the data signal, the address signal, or the command signal. When the 16-bit signals BRX<0:15> are not the data signal, the input signal status determiner 64 outputs the 18-bit signals BRX<0:17> to the state machine 63. On the other hand, when the 16-bit signals BRX<0:15> are the data signal, the input signal status determiner 64 outputs the 16-bit signals BRX<0:15> to the parallelizer 61.

The state machine 63 receives the 18-bit bank valid data signals BRX<0:17> from the input signal status determiner 64, and outputs the address/command signals ADD/CON for controlling the operation of the DRAM by using the received signals. The internal command signals, the internal address signals, and the internal control signals are generated in response to the address/command signals ADD/CON. The internal command signals include the internal active command signal ACT, the internal inactive command signal PCG, the internal read command signal READ, and the internal write command signal WRITE. The internal address signals include the row addresses XADD and the column addresses YADD. The internal control signals include the input data strobe signals DSTROBE16<0:3> and DSTROBE64, the control signals DRVEN_P<0:3>, the pipe input strobe signals PINSTROBE, and the pipe output control signals POUT<0:3>.

FIG. 6 is a block diagram of the state machine 63 illustrated in FIG. 5.

The state machine 63 includes a command generator 631, an input data strobe generator 632, a row address generator 633, a column address generator 634, a read data pipe controller 635, and a data output controller 636.

The command generator 631 is enabled in response to the most significant bit BRX<17> of the bank valid data signals BRX<0:17>, and decodes the bits BRX<0:15> to generate the internal command signals, such as the internal active command signal ACT, the internal inactive command signal PCG, the internal read command signal READ, and the internal write command signal WRITE. The command generator 631 is implemented with a decoder that receives n digital signals to generate $2^n$ digital signals.

The input data strobe generator 632 generates the input data strobe signals DSTROBE16<0:3> and DSTROBE64 in response to the most significant bit BRX<17> of the bank valid data signals BRX<0:17> and the write command signal WRITE. The input data strobe signals DSTROBE16<0:3> and DSTROBE64 are used as the control signals for controlling the operation of the parallelizer 61.

The row address generator 633 generates the bank valid data signals BRX<0:m> (where m is a positive integer) as the row addresses XADD<0:m> in response (synchronization) to the internal active command signal ACT.

The column address generator 634 generates the bank valid data signals BRX<0:n> (where n is a positive integer) as the column addresses YADD<0:n> in response to the write command signal WRITE and the read command signal READ.

The read data pipe controller 635 generates the pipe input strobe signal PINSTROBE and the pipe output control signal POUT<0:3> in response to the read command signal READ.

The data output controller 636 generates the control signals DRVEN_P<0:3> using the bank select signals Pi_BK<0:7> in response to the read command signal READ. As one example, the signals for selecting the bank BANK0 are specified and indicated by a reference symbol BK0_P<0:3>. The control signals DRVEN_P<0:3> are used as the control signals for controlling the operation of the port selector 66.

The parallelizer 61 parallelizes the bank valid data signals BRX<0:15> transferred from the signal status determiner 64, and outputs the 64-bit parallel signals. That is, while the signals BRX<0:15> transferred from the input signal status determiner 64 are input in the previously parallelized signal format, 64-bit data are read or written in the memory cell regions of the banks BANK0 to BANK7. Therefore, 16-bit data need to be converted into 64-bit data.

The serializer 62 receives the 64-bit data signals from the 64 data bus sense amplifiers 14 connected to the data buses of the banks, and serializes the 64-bit data signals into 16-bit data signals DO<0:15> in response to the pipe input strobe signal PINSTROBE and the pipe output control signal POUT<0:3>.

As illustrated in FIG. 5, the port selector 66 sequentially receives the data signals DO<0:15> from the serializer 62 by 16 bits, and outputs the output valid data signals Pi_DATA<0:15> to the port selected by the port/bank select signal P/B_SELECT.

The port selector 66 is implemented with demultiplexers (DEMUX). The demultiplexers are allocated to the respective ports PORT0 to PORT3 such that they can perform the signal transfer independently of all the ports PORT0 to PORT3. In addition, each of the respective demultiplexers includes 16 drivers so as to process the 16-bit data signals DO<0:15>.

Because the signals output from the banks BANK0 to BANK7 to the ports PORT0 to PORT3 are shared through the first global data buses GIO_OUT by all the banks BANK0 to BANK7, it is preferable that the respective drivers be implemented with tri-state buffers so as not to affect other banks.

An operation of the multi-port memory device will be described below.

FIG. 7 is a diagram illustrating the transfer path of the input signal Pi_BK<0:7> from the ports PORT0 to PORT3 to the banks BANK0 to BANK7, and FIG. 8 is a diagram illustrating the transfer path of the output signals Pi_DATA<0:15> from the banks BANK0 to BANK7 to the ports PORT0 to PORT3. In FIG. 7, BKj_P<0:3> (where j is 0 to 7) represents a signal identical to the bank select signal Pi_BK<0:7>, but is indicated by a different reference symbol for convenience of explanation.

First, the transfer path of the input signals from the port PORT0 to the bank BANK1 will be described below.

Referring to FIG. 7, the 18-bit input signals (except for the physical link coding bit) are serially input from the external device through the reception pad RX to the port PORT0. The port PORT9 converts the 18-bit input signals into the 26-bit valid signals and transfers them through the second global data buses GIO_IN. Because the second global data buses GIO_IN are connected to all the banks BANK0 to BANK7 through the second local data buses LIO_BIN (see FIG. 1), the 26-bit valid signals are transferred to the bank selectors 65 (see FIG. 5) of the banks BANK0 to BANK7 through the second local data buses LIO_BIN.

Because the 26-bit valid signals transferred from the port PORT0, especially the input valid data signals P0_RX<0:17>, have to be transferred only to the bank BANK1, it is necessary to prevent the signals from being transferred to all the banks BANK0 and BANK2 to BANK7 other than the bank BANK1. For this purpose, the bank select signals P0_BK<0:7> are used.

The bank select signals P0_BK<0:7> consists of the 26-bit valid signals provided from the port PORT0 together with the input valid data signals P0_RX<0:7>. The bank select signals P0_BK<0:7> are input to the bank selector 65 of the bank BANK1 through the second global data buses GIO_IN together with the input valid data signals P0_RX<0:17> and controls the bank selector 65.

The bank selector 65 for managing the input signal transfer of the bank BANK1 is enabled in response to the bank select signals P0_BK<0:7>, that is, BK1_P<0:3>, receives the input valid data signals P0_RX<0:17> through the second global data buses GIO_IN, and transfers the received signals P0_RX<0:17> to the bank BANK1. At this point, because the remaining bank select signals BK0_P<0:3> and BK2_P<0:3> to BK7_P<0:3> are deactivated to a logic high state or a logic low state, the bank selectors 65 of the banks BANK0 and BANK2 to BANK7 are not enabled, so that the input valid data signals P0_RX<0:17> are not transferred to the banks BANK0 and BANK2 to BANK7.

Next, the transfer path of the output signals from the bank BANK1 to the port PORT0 will be described below.

Referring to FIG. 8, the 64-bit data signals output from the bank BANK1 are serialized into the 16-bit data signals DO<0:15> by the serializer 62 of the bank controller BC1, and the 16-bit data signals DO<0:15> are output to the port selector 66, for example, the demultiplexer. The demultiplexer transfers the data signals DO<0:15> as the output valid data signals P0_DATA<0:15> through the first global data buses GIO_OUT in response to the activated control signals DRVEN_P<0> among the control signals DRVEN_P<0:3>.

The output valid data signals transferred through the first global data buses GIO_OUT are transferred to the port PORT0 through the third local data buses LIO_P1.

Next, the normal read operation of the multi-port memory device will be described. The normal read operation is to read data from a specific address of a corresponding bank.

Referring to FIG. 1, the input signals (see FIGS. 4D and 4E) corresponding to the read operation are serially input to the port PORT0 through the reception pad RX, and the parallelizer 411 parallelizes the input signals to output the 26-bit valid signals.

The 26-bit valid signals output from the port PORT0 are input through the second global data buses GIO_IN to the bank selector 65 of the bank controller BC1 managing the bank BANK1. At this point, because the bank selector 65 of the bank controller BC1 is connected to the second global data buses GIO_IN through the second local data buses LIO_BIN, the signals are also received from the ports PORT1 to PORT3 as well as the bank BANK0.

Accordingly, the 26-bit valid signals input from the ports PORT0 to PORT3 contain the 8-bit bank select signals Pi_BK<0:7>, the corresponding banks are selected by the bank select signals Pi_BK<0:7>. Because only the bank select signal P0_BK<1> is activated, the bank controller BC1 of the bank BANK1 does not receive the 26-bit signals (which are not valid signals) from the ports PORT1 to PORT3, but receives the input valid data signals P0_RX<0:17> from the port PORT0.

The state machine 63 of the bank controller BC1 activates the internal active signal ACT and the read command signal READ by using the input valid data signals P0_RX<0:17>, generates the row/column addresses XADD and YADD of the bank BANK1 through the row/column address generators 633 and 634 by using the activated internal active signal ACT and the activated read command signal READ, activates the pipe input strobe signal PINSTROBE and the pipe output control signal POUT through the read data pipe controller 635, and activates the control signal DRVEN_P through the data output controller 636.

In response to the read command signal READ input from the bank controller BC1, the 64-bit data from the bank BANK1 are amplified by the 64 data bus sense amplifiers through the data lines, and are output to the serializer 62.

The 64-bit output signals input to the serializer 62 are serialized into 16-bit signals in response to the pipe input strobe signal PINSTROBE and the pipe output control signal POUT. That is, the serializer 62 converts the 64-bit output signals into four unit serial signals each of which are 16 bits, temporarily stores them, and sequentially outputs them to the port selector 66 by units of 16 bits.

The port selector 66 sequentially outputs the data signals DO<0:15> as the output valid data signals P0_DATA<0:15> by units of 16 bits to the selected port PORT0 through the first global data buses GIO_OUT in response to the control signals DRVEN_P<0:3> which correspond to the bank select signals BK0_P<0:3> as illustrated in FIG. 5.

As illustrated in FIG. 3, the port PORT0 receives the output valid data signals P0_DATA<0:15> through the first global data buses GIO_OUT in parallel. The output valid data signals P0_DATA<0:15> are serialized by the serializer 421 and are transferred to the corresponding external device through the transmission pad TX.

Next, the normal write operation of the multi-port memory device will be described. The normal write operation is to write data to a specific address of the corresponding bank. The input signals of four frames are received from the reception pad RX. The first frame corresponds to the command signal (hereinafter, referred to as a command frame) (see FIG. 4B), and the remaining three frames correspond to data signals (hereinafter, referred to as data frames) (see FIG. 4C). Each of the input signals is 16 bits. That is, the input signals are 64 bits.

Referring to FIG. 1, the command frame and the data frames corresponding to the write operation are serially input to the port PORT0 through the reception pad RX, and the parallelizer 411 parallelizes the serial frame signals to output the 26-bit valid signals.

The 26-bit valid signals output from the port PORT0 are input through the second global data buses GIO_IN to the bank selector 65 of the bank controller BC1 managing the bank BANK1. At this point, because the bank selector 65 of the bank controller BC1 is connected to all the second global data buses GIO_IN through the second local data buses LIO_BIN, the signals are also received from the ports PORT1 to PORT3 as well as the bank BANK0.

Accordingly, the 26-bit valid signals input from the ports PORT0 to PORT3 contain the 8-bit bank select signals Pi_BK<0:7>, the corresponding banks are selected by the bank select signals Pi_BK<0:7>. Because only the bank select signal P0_BK<1> is activated, the bank controller BC1 of the bank BANK1 does not receive the 26-bit signals (which are not valid signals) from the ports PORT1 to PORT3, but receives the input valid data signals P0_RX<0:17> from the port PORT0.

The state machine 63 of the bank controller BC1 activates the internal active signal ACT and the write command signal WRITE by using the input valid data signals P0_RX<0:17>, generates the row/column addresses XADD and YADD of the bank BANK1 through the row/column address generators 633 and 634 by using the activated internal active signal ACT and the activated write command signal WRITE, and activates the input data strobe signal DSTROBE16<0:3> and DSTROBE64 through the input data strobe generator 632.

In this state, the 16-bit bank valid data signals BRX<0:15> corresponding to the valid data signals among the valid data signals BRX<0:15> of the three data frames signals consecutively input are parallelized into the 64 bits (16×4) by the parallelizer 61 (see FIG. 6). Simultaneously, the 64-bit signals are written to the memory cell array 10 of the bank BANK1 through the write driver W/D.

As described above, when the four frame signals (command frame and data frames) are consecutively input to one bank during the write operation, the 64 data are simultaneously written to the memory cells. If other command (interrupted operation) is executed before four frames are all input, only data input until that time are written to the memory cells.

In such a multi-port memory device, all ports can independently access the banks at the same time. Therefore, when the input data are simultaneously input from at least two ports through the global data buses to one bank, the two input data may conflict together, resulting in the damage of the input data.

SUMMARY OF THE INVENTION

It is, therefore, an object of the present invention to provide a multi-port memory device in which a plurality of ports can access all banks at the same time. The multi-port memory device can detect the conflict between data input from two ports to one bank at the same.

In accordance with an aspect of the present invention, there is provided a multi-port memory device including: a plurality of banks; a plurality of ports for simultaneously accessing the plurality of banks; a plurality of global data buses; a data conflict detector for comparing valid data signals input from the plurality of ports through the global data buses to the plurality of banks, and detecting data conflict caused when the valid data signals are simultaneously input to the same bank.

In accordance with another aspect of the present invention, there is provided a multi-port memory device including: a plurality of banks; a plurality of ports for performing a data communication with an external device in a serial input/output (I/O) interface scheme, and performing a parallel data communication with the plurality of banks by simultaneously accessing the plurality of banks; a first global data bus for supporting the parallel data communication between the plurality of ports and the plurality of banks; and a bank controller for receiving valid data signals input from the plurality of ports through the first global data bus and transferring the received valid data signals to the banks, and comparing the valid data signals to detect data conflict caused when the valid data signals are simultaneously input to the same bank.

Accordingly, the multi-port memory device can detect the conflict between data input from at least two ports to one bank by comparing the signals input from the ports.

BRIEF DESCRIPTION OF THE DRAWINGS

The above and other objects and features of the present invention will become apparent from the following description of the preferred embodiments given in conjunction with the accompanying drawings, in which:

FIGS. 4A-4F are diagrams illustrating a frame format of a signal input to the port of FIG. 1;

DETAILED DESCRIPTION OF THE INVENTION

A multi-port memory device in accordance with exemplary embodiments of the present invention will be described in detail with reference to the accompanying drawings.

Figure 9:
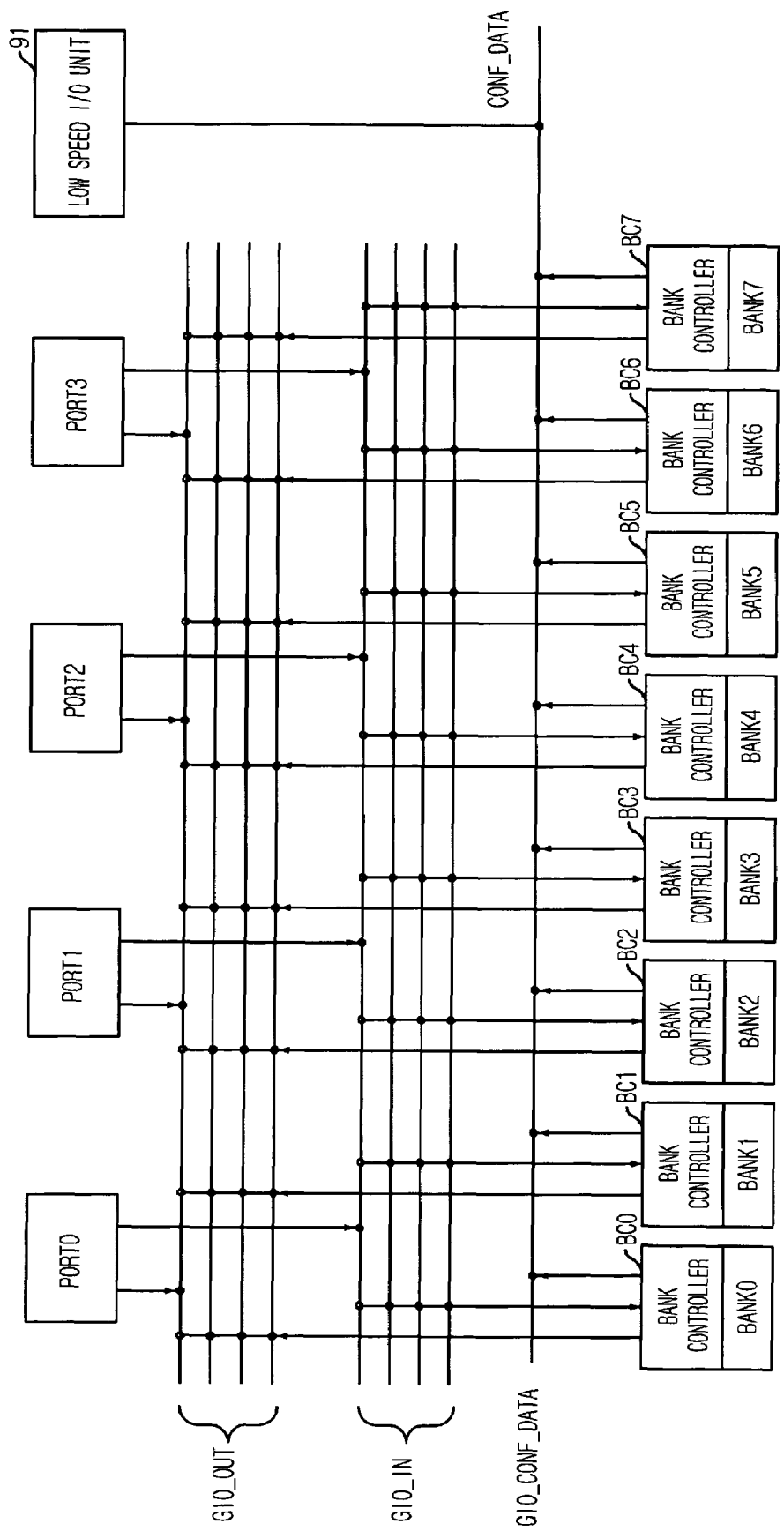
FIG. 9 is a block diagram of a multi port memory device in accordance with an embodiment of the present invention.
Figure 10:
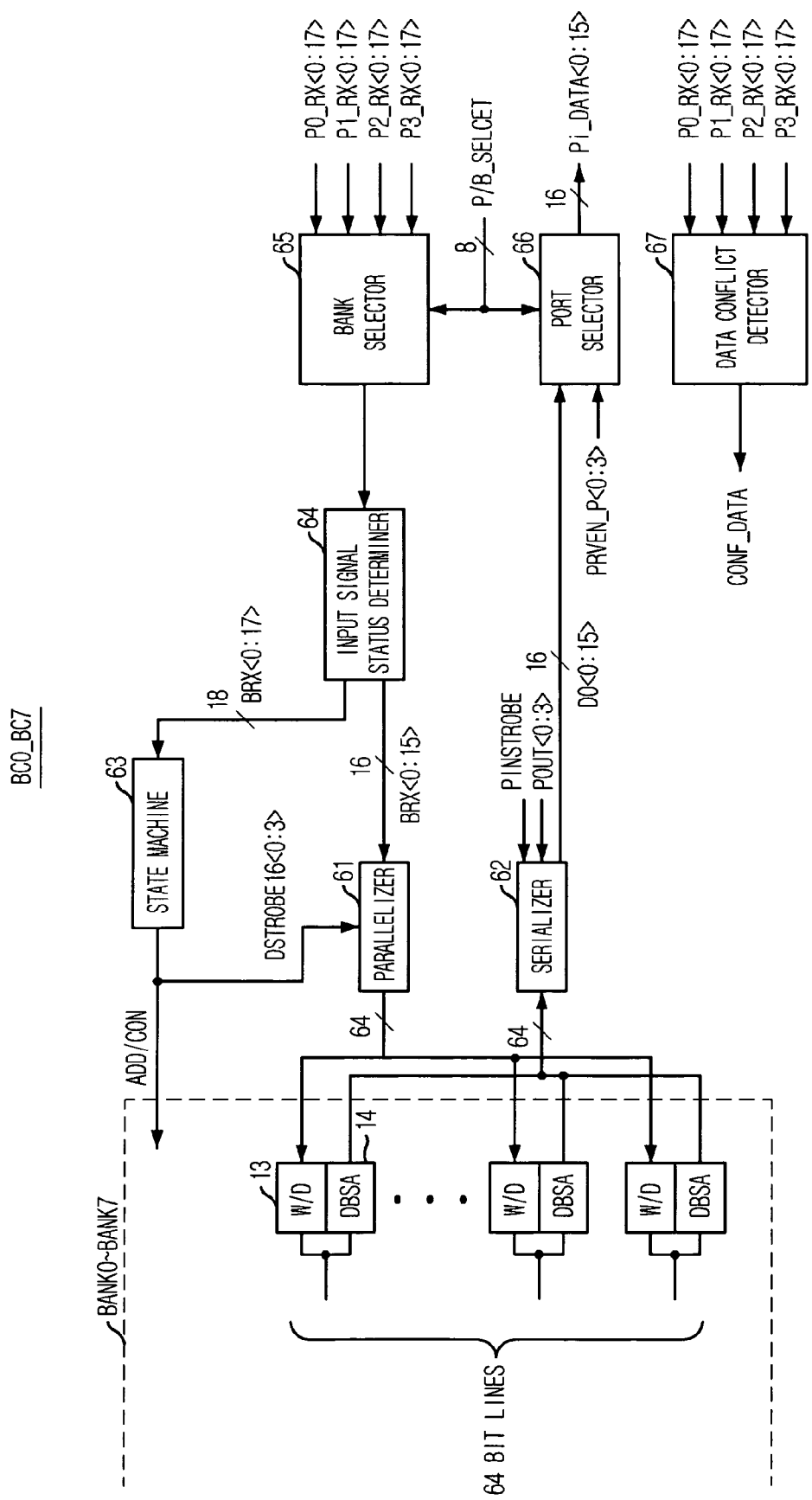
FIG. 10 is a block diagram of a bank controller illustrated in FIG. 9.

FIG. 9 is a block diagram of a multi-port memory device in accordance with an embodiment of the present invention, and FIG. 10 is a block diagram of a bank controller illustrated in FIG. 9.

Referring to FIGS. 9 and 10, the multi-port memory device is configured such that a plurality of ports PORT0 to PORT3 can independently perform the parallel data communication with a plurality of banks BANK0 to BANK7 through global data buses GIO_IN and GIO_OUT.

Figure 5:
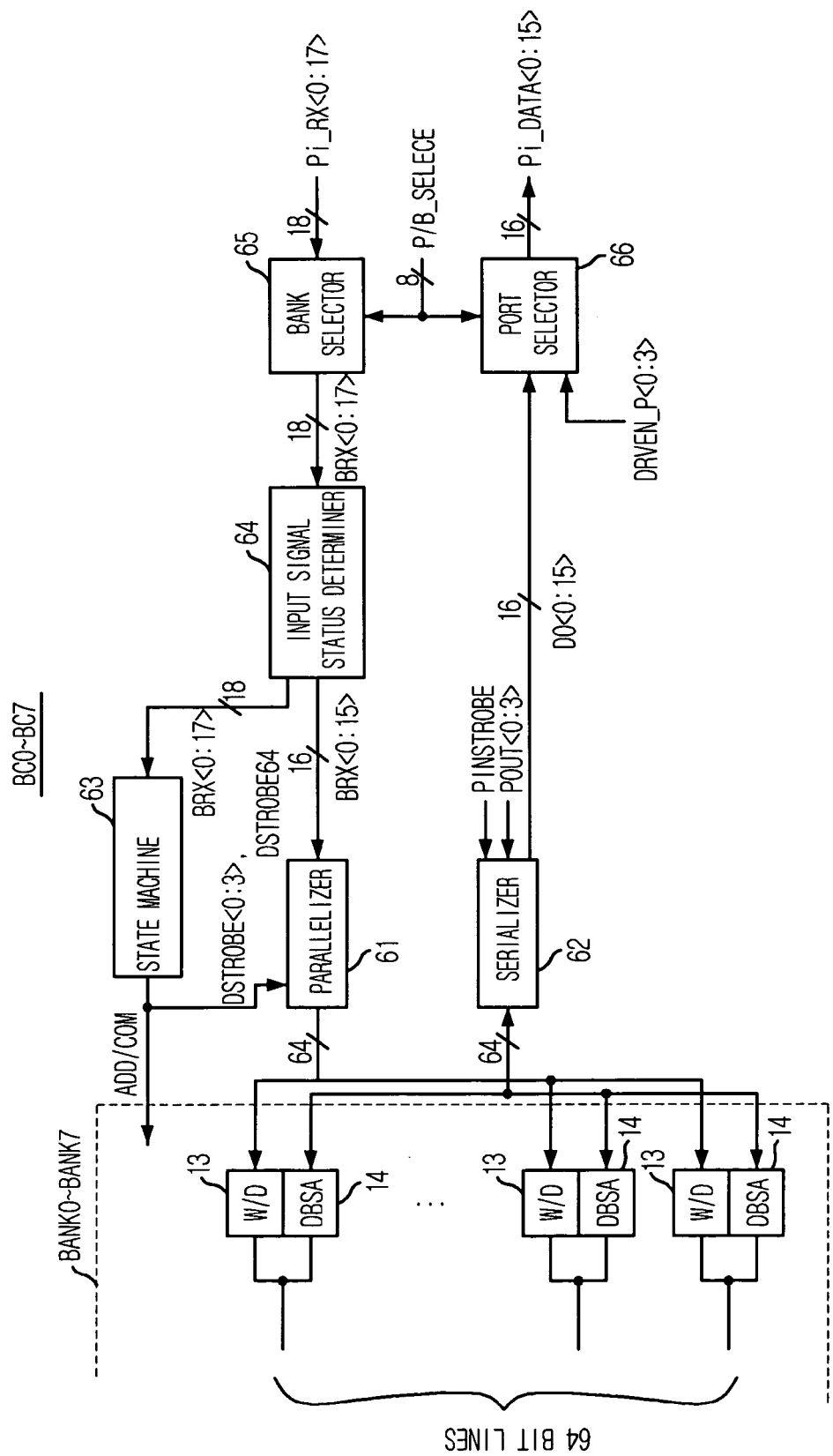
FIG. 5 is a block diagram of a bank controller illustrated in FIG. 1.
Figure 6:
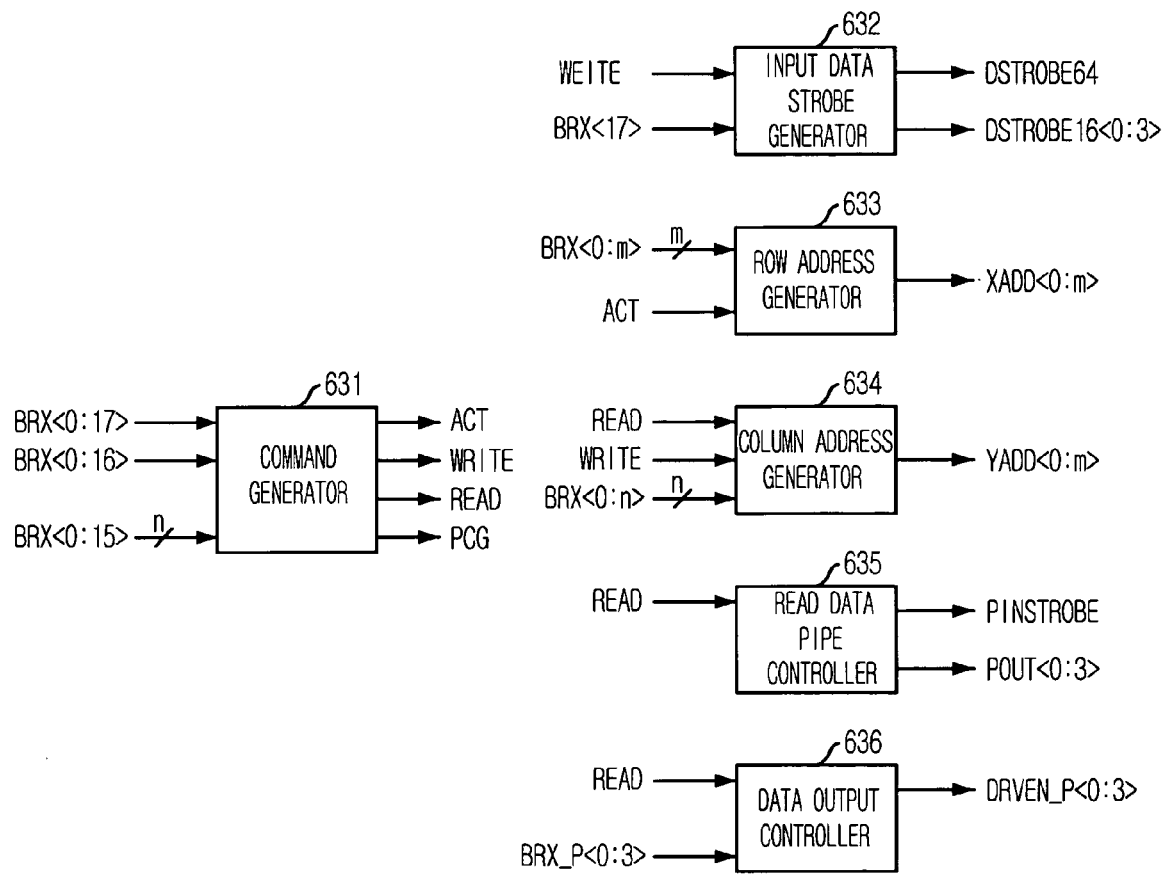
FIG. 6 is a block diagram of a state machine illustrated in FIG. 5.

As illustrated in FIG. 10, each of bank controllers BC0 to BC7 further includes a data conflict detector 67, in addition to the structure of FIG. 5. The data conflict detector 67 simultaneously receives the input valid data signals P0_RX<0:17> to P3_RX<0:17> from the ports PORT0 to PORT3 through the global data buses GIO_IN, and compares the bank data bits P0_RX<6:9> to P3_RX<6:9> corresponding to the bank data to detect whether the input valid signals conflict with one another.

Figure 1:
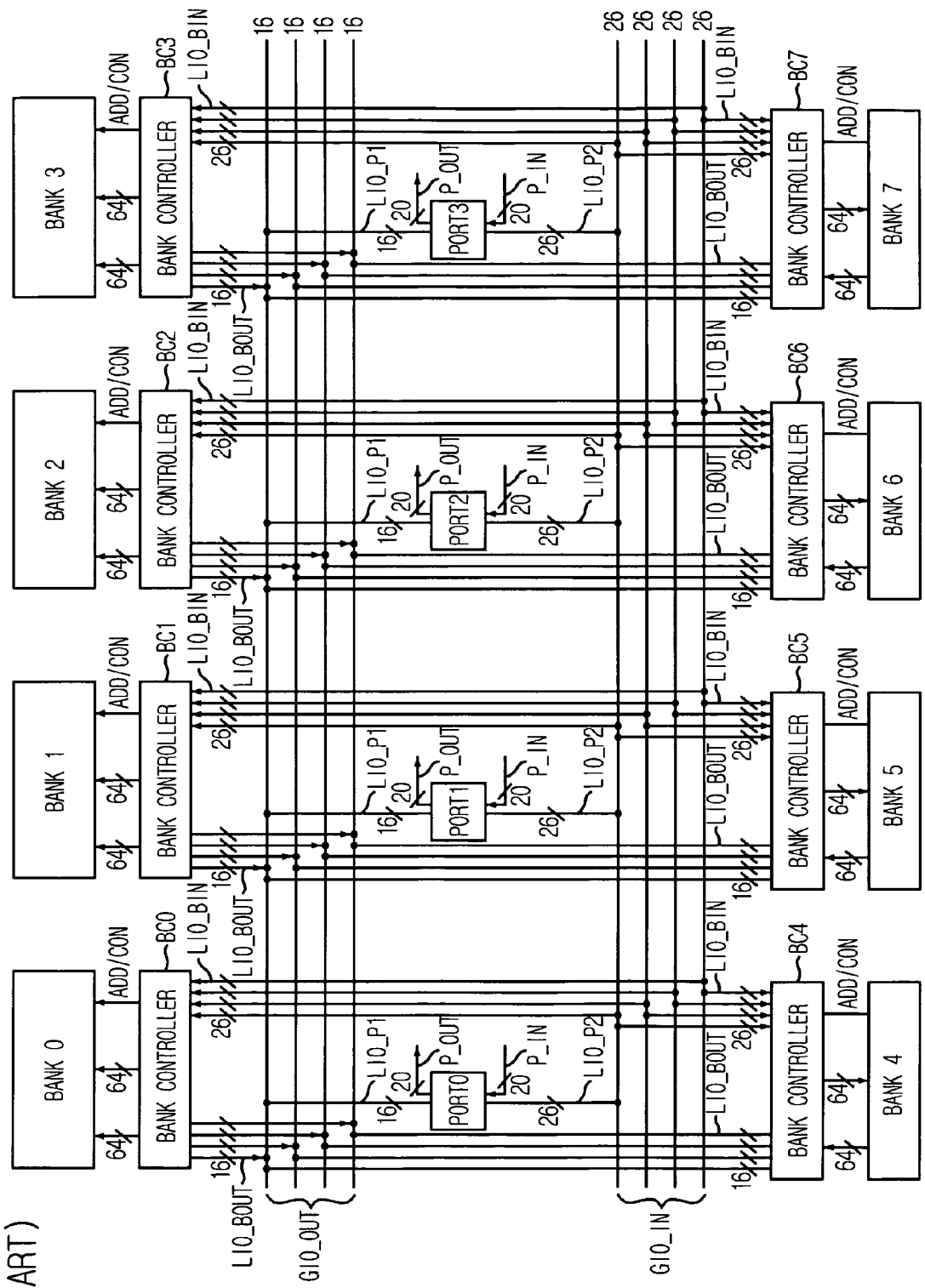
FIG. 1 is a block diagram of a multi port memory device disclosed in Korean Patent Application No. 2006-0032948.
Figure 2:
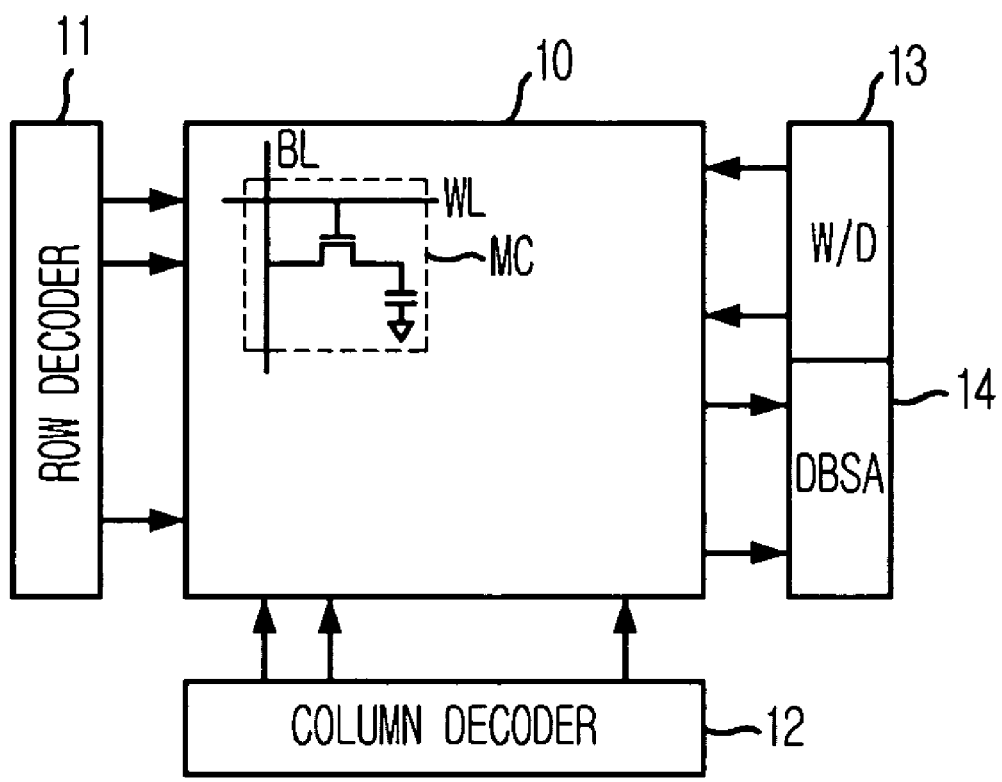
FIG. 2 is a schematic diagram of a bank illustrated in FIG. 1.
Figure 3:
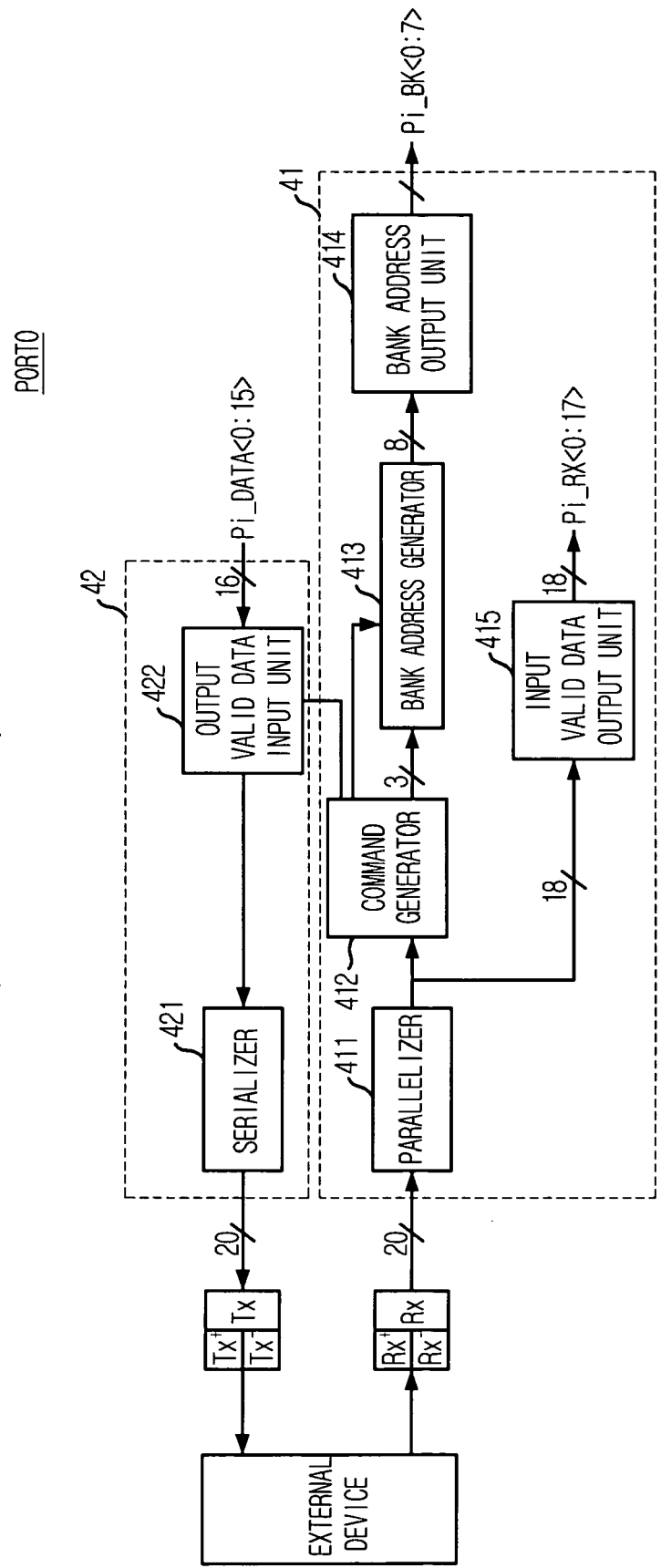
FIG. 3 is a block diagram of a port illustrated in FIG. 1.
Figure 4A:
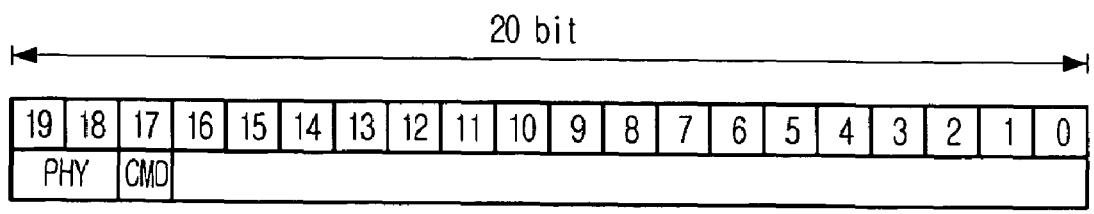
Figure 4B:
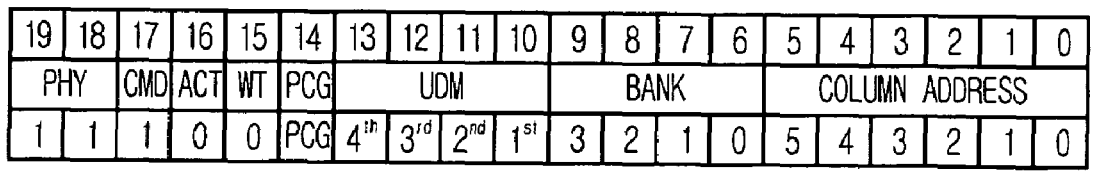

The input valid data signals P0_RX<0:17> to P3_RX<0:17> input from the ports PORT0 to PORT3 through the global data buses GIO_IN contain the bank data as illustrated in FIGS. 4B and 4D. When the input signals having the frame format of FIG. 4B or 4D are serially input from the external device, the ports PORT0 to PORT3 parallelizes the input signals and transfers the parallel signals through the global data buses GIO_IN. The input valid data signals P0_RX<0:17> to P3_RX<0:17>, input through the global data buses GIO_IN to the bank controllers BC0 to BC7, have the same format as that of FIG. 4B or 4D.

The data conflict detector 67 receives the input valid data signals P0_RX<0:17> to P3_RX<0:17> from the ports PORT0 to PORT3 through the global data buses GIO_IN, and compares the bank data bits P0_RX<6:9> to P3_RX<6:9> containing the bank data to detect whether the input valid signals are conflicted with one another.

For example, when the bank data bits P0_RX<6:9> from the port PORT0 are "0001", the bank data bits P1_RX<6:9> from the port PORT1 are "0001", the band data bits P2_RX<6:9> from the port PORT2 are "0101", and the bank data bits P3_RX<6:9> from the port PORT3 are "0011", the input valid data P0_RX<0:17> to P1_RX<0:17> input from the ports PORT0 and PORT1 are transferred to one same bank, resulting in the conflict therebetween.

In the frame formats of the input signals input from the external device to the ports PORT0 to PORT3 as illustrated in FIGS. 4B and 4D, the bank data bits are 4 bits, but only 3 bits of the eight banks BANK0 to BANK7 are used. The 3-bit bank data bits are decoded to generate 8-bit bank select signal. For example, the bank BANK0 is selected when the bank data bits are "000", the bank BANK1 is selected when the bank data bits are "001", the bank BANK2 is selected when the bank data bits are "010", the bank BANK3 is selected when the bank data bits are "011", the bank BANK4 is selected when the bank data bits are "100", the bank BANK5 is selected when the bank data bits are "101", the bank BANK6 is selected when the bank data bits are "110", and the bank BANK7 is selected when the bank data bits are "111".

Accordingly, the conflict of the input valid data signals can be easily detected by comparing the bank data bits input from the ports PORT0 to PORT3.

Figure 11:
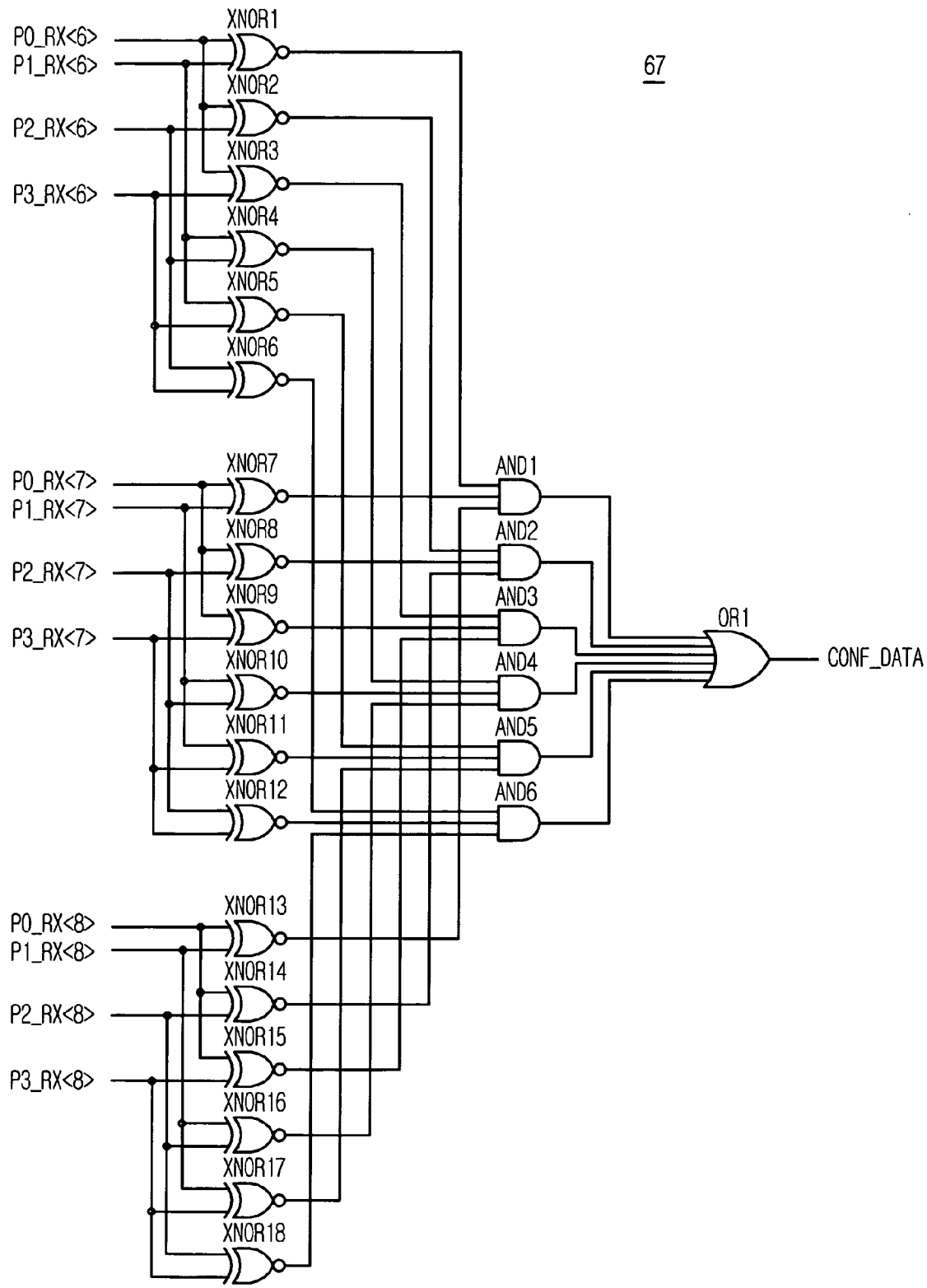
FIG. 11 is a circuit diagram of a data conflict detector illustrated in FIG. 10.

FIG. 11 is a circuit diagram of the data conflict detector 67. Referring to FIG. 11, the data conflict detector 67 includes a plurality of exclusive NOR gates XNOR1 to XNOR18, a plurality of AND gates AND1 to AND6, and an OR gate OR1.

The exclusive NOR gates XNOR1 to XNOR18 perform the XNOR operation on the bank data bits input from the ports PORT0 to PORT3. For example, when the bank data bits are identical to one another, the exclusive NOR gates XNOR1 to XNOR18 output logic HIGH (1). On the other hand, when the bank data bits are different from one another, the exclusive NOR gates XNOR1 to XNOR18 output logic LOW (0).

The exclusive NOR gates XNOR1 to XNOR6 compare the least significant bits P0_RX<6> to P3_RX<6> among the bank data bits, the exclusive NOR gates XNOR7 to XNOR12 compare the middle bits P0_RX<7> to P3_RX<7>, and the exclusive NOR gates XNOR13 to XNOR18 compare the most significant bits P0_RX<8> to P3_RX<8>.

When the outputs of the exclusive NOR gates XNOR1, XNOR7 and XNOR13 are all logic HIGH, the AND gate AND1 outputs logic HIGH. When the outputs of the exclusive NOR gates XNOR2, XNOR8 and XNOR14 are all logic LOW, the AND gate AND2 outputs logic HIGH. When the outputs of the exclusive NOR gates XNOR3, XNOR9 and XNOR15 are all logic HIGH, the AND gate AND3 outputs logic HIGH. When the outputs of the exclusive NOR gates XNOR4, XNOR10 and XNOR16 are all logic HIGH, the AND gate AND4 outputs logic HIGH. When the outputs of the exclusive NOR gates XNOR5, XNOR11 and XNOR17 are all logic HIGH, the AND gate AND5 outputs logic HIGH. When the outputs of the exclusive NOR gates XNOR6, XNOR12 and XNOR18 are all logic HIGH, the AND gate AND6 outputs logic HIGH.

When any one of the outputs of the AND gates AND1 to AND6 is logic HIGH, the OR gate OR1 outputs logic HIGH. The output signal of the OR gate OR1 is used as the data conflict detection signal CONF_DATA. When the data conflict detection signal CONF_DATA is logic HIGH, it means that the conflict occurs between the input valid data signals. That is, the data conflict detection signal CONF_DATA is enabled to logic HIGH when at least two input valid data signals among the input valid data signals P0_RX<0:17> to P3_RX<0:17> input from the ports PORT0 to PORT3 are identical to each other.

As illustrated in FIG. 9, the data conflict detection signals CONF_DATA from the data conflict detectors 67 of the bank controllers BC0 to BC7 are externally output through a low speed I/O unit 91. The low speed I/O unit 91 is a separate element from the ports PORT0 to PORT3 which operate at a high speed. The low speed I/O unit 91 may be implemented with an output driver for outputting data through an external parallel interface separately provided for controlling the elements except for the ports and monitoring the internal operation states of the memory device. The data conflict detection signal CONF_DATA is transferred to the low speed I/O unit 91 through global data buses GIO_CONF_DATA separately provided from the global data buses GIO_IN and GIO_OUT providing the data communication between the ports PORT0 to PORT3 and the banks BANK0 to BANK7.

The multi-port memory device in accordance with the present invention may further include a storage unit (not shown) for temporarily storing the data conflict detection signals CONF_DATA. The storage unit temporarily stores the data conflict detection signals CONF_DATA output from the data conflict detectors 67 of the bank controllers BC0 to BC7, and outputs the stored data conflict detection signals CONF_DATA through the low speed I/O unit 91 to the outside. At this point, in order to temporarily store the data conflict detection signals CONF_DATA, the storage unit may be implemented with a register that does not occupy a large area.

Although the description has been made of a multi-port memory device including four ports, eight banks and 16-bit frame structure and performing 64-bit prefetch operation, the present invention is not limited to this structure. For example, when the multi-port memory device includes j ports, k banks and m-bit frame structure and performs n-bit prefetch operation, the number of the global data buses has only to be properly adjusted such that data can be communicated between the ports and the banks. In order to transfer data from the ports to the banks, one port needs k buses for transferring bank/port select signal, m buses for transferring input command/address/data signals, and 1 buses for transferring command flag signal and RAS/DM signals. Also, in order to transfer data from the banks to the ports, m buses are needed. That is, the multi-port memory device can be configured while expanding the number of ports, banks, frame bits, and prefetch. "j", "k", "l", "m" and "n" are positive integers.

Figure 7:
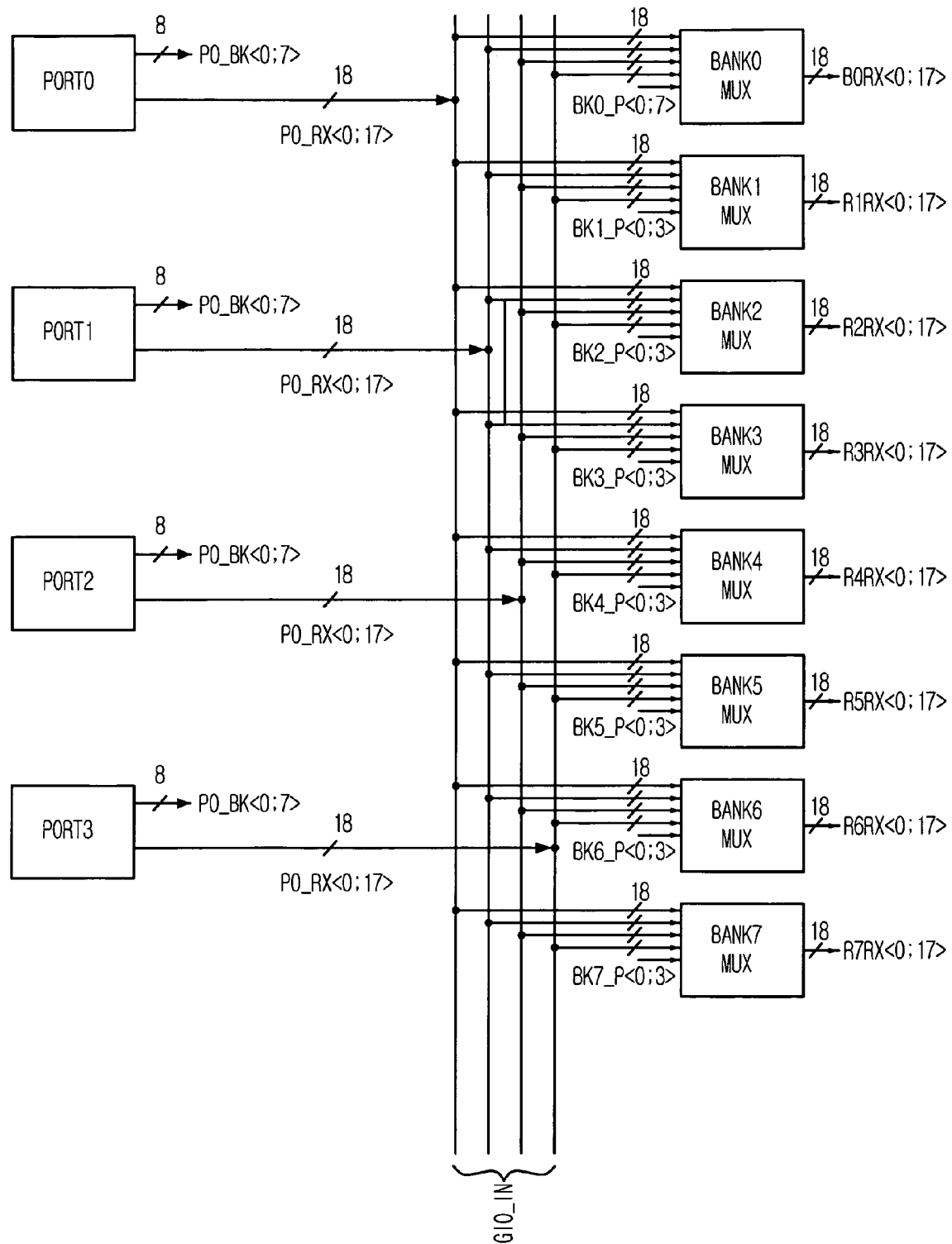
FIG. 7 is a diagram illustrating a transfer path of an input signal from the port to the bank.
Figure 8:
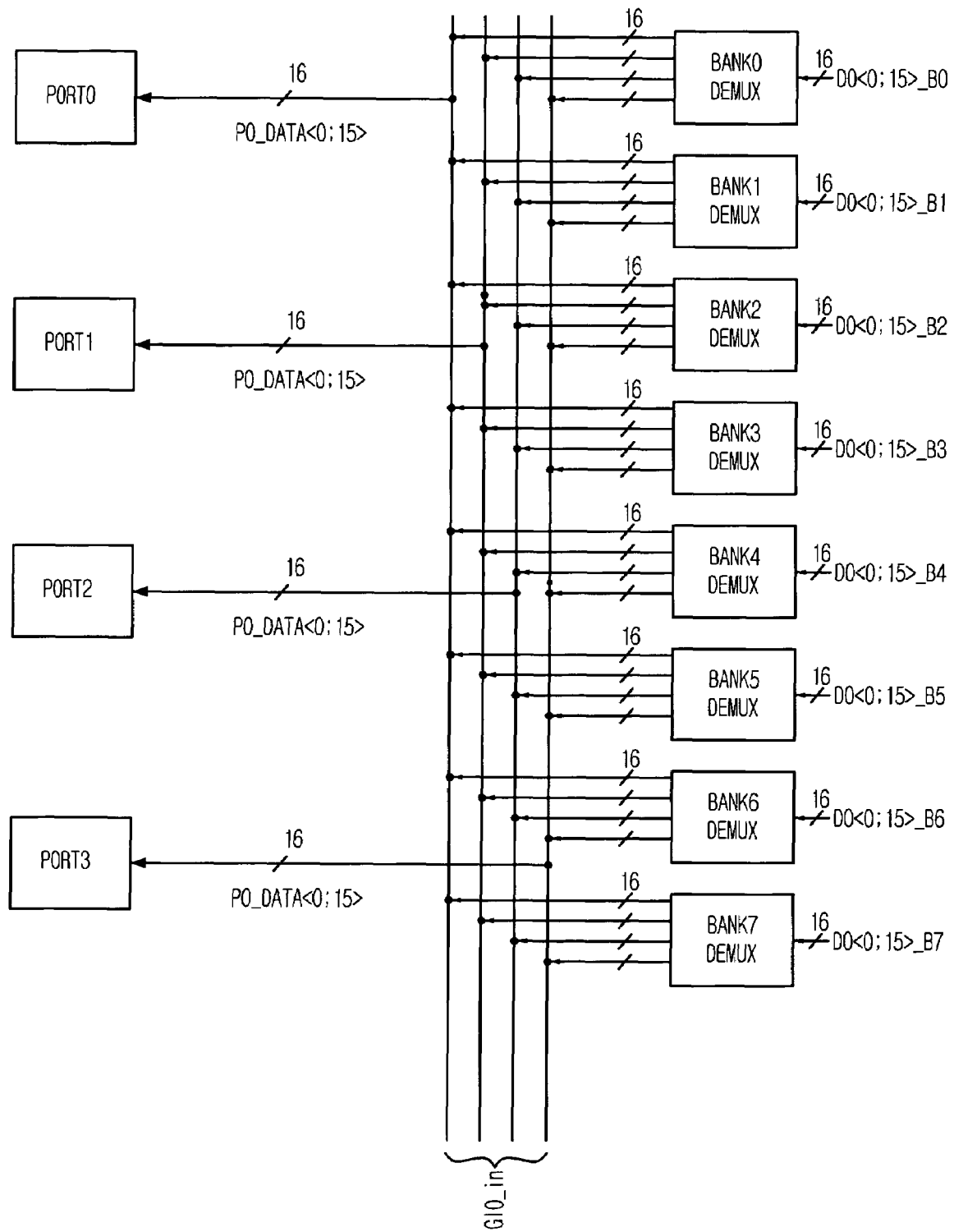
FIG. 8 is a diagram illustrating a transfer path of an output signal from the bank to the port.

In the above-described multi-port memory device, the conflict between the valid data signals is detected by comparing the bits corresponding to the bank data among the valid data signals input through the global data buses to the bank controller. Alternatively, the data conflict can be detected by receiving the valid data signals before loading the data on the global data buses. As illustrated in FIG. 7, in the case of the bank BANK0, the data conflict can be detected at each bank by using BK0_P<0:3>. For example, when two BK0_P<0:3> are logic HIGH, it can be determined that the conflict occurs between the ports.

As described above, in the multi-port memory device configured such that a plurality of ports can simultaneously access all banks, an erroneous operation of the multi-port memory device can be easily monitored by detecting the conflict between data input from at least two ports to one bank at the same time.

The present application contains subject matter related to Korean patent application Nos. 2005-90937 & 2006-33764, filed in the Korean Intellectual Property Office on Sep. 29, 2005 & Mar. 13, 2006, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A multi-port memory device, comprising:
a plurality of banks;
a plurality of ports for simultaneously accessing the plurality of banks;
a plurality of global data buses;
a data conflict detector for comparing valid data signals input from the plurality of ports through the global data buses to the plurality of banks, and detecting data conflict caused when the valid data signals are simultaneously input to the same bank; and
a data conflict detection signal input/output (I/O) unit for receiving a data conflict detection signal output from the data conflict detector when the data conflict occurs between the valid data signals, and outputting the data conflict detection signal to an external device,
wherein the data conflict detection signal I/O unit operates at a speed lower than the ports.

2. The multi-port memory device of claim 1, wherein the data conflict detector detects the data conflict between the valid data signals by comparing bits corresponding to bank data of the valid data signals.

3. The multi-port memory device of claim 2, wherein the data conflict detector determines that the valid data signals are in conflict when bank data of the valid data signals output from the different ports are identical to one another.

4. A multi-port memory device, comprising:
a plurality of banks;
a plurality of ports for performing a data communication with an external device in a serial input/output (I/O) interface scheme, and performing a parallel data communication with the plurality of banks by simultaneously accessing the plurality of banks;
a first global data bus for supporting the parallel data communication between the plurality of ports and the plurality of banks;
a bank controller for receiving valid data signals input from the plurality of ports through the first global data bus and transferring the received valid data signals to the banks, and comparing the valid data signals to detect data conflict caused when the valid data signals are simultaneously input to the same bank; and
a data conflict detection signal input/output (I/O) unit for receiving a data conflict detection signal output from the bank controller when the conflict occurs between the valid data signals, and outputting the data conflict detection signal to an external device,
wherein the data conflict detection signal I/O unit operates at a speed lower than the ports.

5. The multi-port memory device of claim 4, wherein the bank controller detects the data conflict between the valid data signals by comparing bits corresponding to bank data of the valid data signals.

6. The multi-port memory device of claim 5, wherein the bank controller determines that the valid data signals are conflicted when bank data of the valid data signals output from the different ports are identical to one another.

7. The multi-port memory device of claim 6, wherein the bank controller transfers the valid data signals to the corresponding banks in response to the bank data.

8. The multi-port memory device of claim 7, further comprising a second global data bus for receiving the data conflict detection signal from the bank controller and transferring the received data conflict detection signal to the data conflict detection signal I/O unit.

9. A method for detecting a data conflict of a multi-port memory device having a plurality of ports performing a serial input/output (I/O) communication with external devices, and a plurality of banks performing a parallel I/O communication with the ports through a plurality of global data buses, comprising steps of:
receiving valid data signals input from the external devices in series;
transferring the valid data signals to the banks from the plurality of ports through the global data buses in parallel;
detecting a data conflict caused when the valid data signals are simultaneously input to the same bank by comparing the valid data signals; and
generating and outputting a data conflict detection signal to the external devices when the data conflict occurs between the valid data signals,
wherein the data conflict detection signal is generated and outputted at a speed lower than the ports.

10. The method as recited in claim 9, wherein the step of detecting the data conflict includes a step of comparing bits corresponding to bank data of the valid data signals.

11. The method as recited in claim 10, wherein the data conflict is detected when bank data of the valid data signals output from the different ports are identical to one another.

* * * * *